United States Patent [19]

Mills

[11] Patent Number: 5,611,167
[45] Date of Patent: Mar. 18, 1997

[54] MULTIDIRECTIONAL DEEP SEA FISHING CANNONBALL

[76] Inventor: Kris B. Mills, 11836 Chaney Dr., Rapid City, Mich. 49676

[21] Appl. No.: 317,357

[22] Filed: Oct. 4, 1994

[51] Int. Cl.$^6$ .................................................. A01K 91/08
[52] U.S. Cl. .................................... 43/43.13; 43/43.1
[58] Field of Search .............................. 43/43.13, 43.1, 43/44.92, 44.96, 27.2, 27.4, 17.2; D22/145; 114/245

[56] References Cited

U.S. PATENT DOCUMENTS

| | | | |
|---|---|---|---|
| D. 243,177 | 1/1977 | Kammeraad | D22/145 |
| 1,200,135 | 10/1916 | Reynolds | 43/42.04 |
| 1,232,211 | 7/1917 | Burkman | 43/42.22 |
| 2,563,386 | 8/1951 | Wight | 43/42.22 |
| 2,600,437 | 6/1952 | Siepe | 43/42.06 |
| 2,741,863 | 4/1956 | Magill | 43/43.13 |
| 2,776,517 | 1/1957 | Borgstrom | 43/43.13 |
| 2,808,677 | 10/1957 | Dusablon | 43/42.22 |
| 3,023,537 | 3/1962 | Madson | 43/43.13 |
| 3,032,912 | 5/1962 | Bengtsson | 43/43.13 |
| 3,145,498 | 8/1964 | Kochis | 43/43.13 |
| 3,842,528 | 10/1974 | Hish | 43/43.13 |
| 3,916,556 | 11/1975 | Armanno | 43/42.06 |
| 3,971,153 | 7/1976 | Harms | 43/43.13 |
| 4,128,960 | 12/1978 | Marek | 43/43.13 X |
| 4,948,083 | 8/1990 | McNaney, Jr. et al. | 248/514 |
| 5,142,812 | 9/1992 | Borden | 43/43.13 X |
| 5,185,951 | 2/1993 | Hemmerle | 43/43.13 |
| 5,339,561 | 8/1994 | Weber | 43/43.13 |
| 5,357,892 | 10/1994 | Vatne et al. | 114/244 |

*Primary Examiner*—Jeanne M. Elpel
*Attorney, Agent, or Firm*—Robert E. Bushnell, Esq.

[57] ABSTRACT

A directional cannonball weight having a body made of solid, non-buoyant mass of substantially homogeneous material with a skag defining a vertical plane and serving as a rudder, extending outwardly from the body and defining an oblique angle with the direction of travel of the weight while the weight is under tow. The body and skag may be constructed as a single monolithic structure, or with the body having a slot formed in the body, a pin for pivotally fixing the skag to the body within the slot on the body so the skag protrudes from the slot of the body and may extend in varying angular orientations with respect to the body as the skag is pivoted around the pivot pin and a locking bolt for fixing the skag at a desired position.

21 Claims, 3 Drawing Sheets

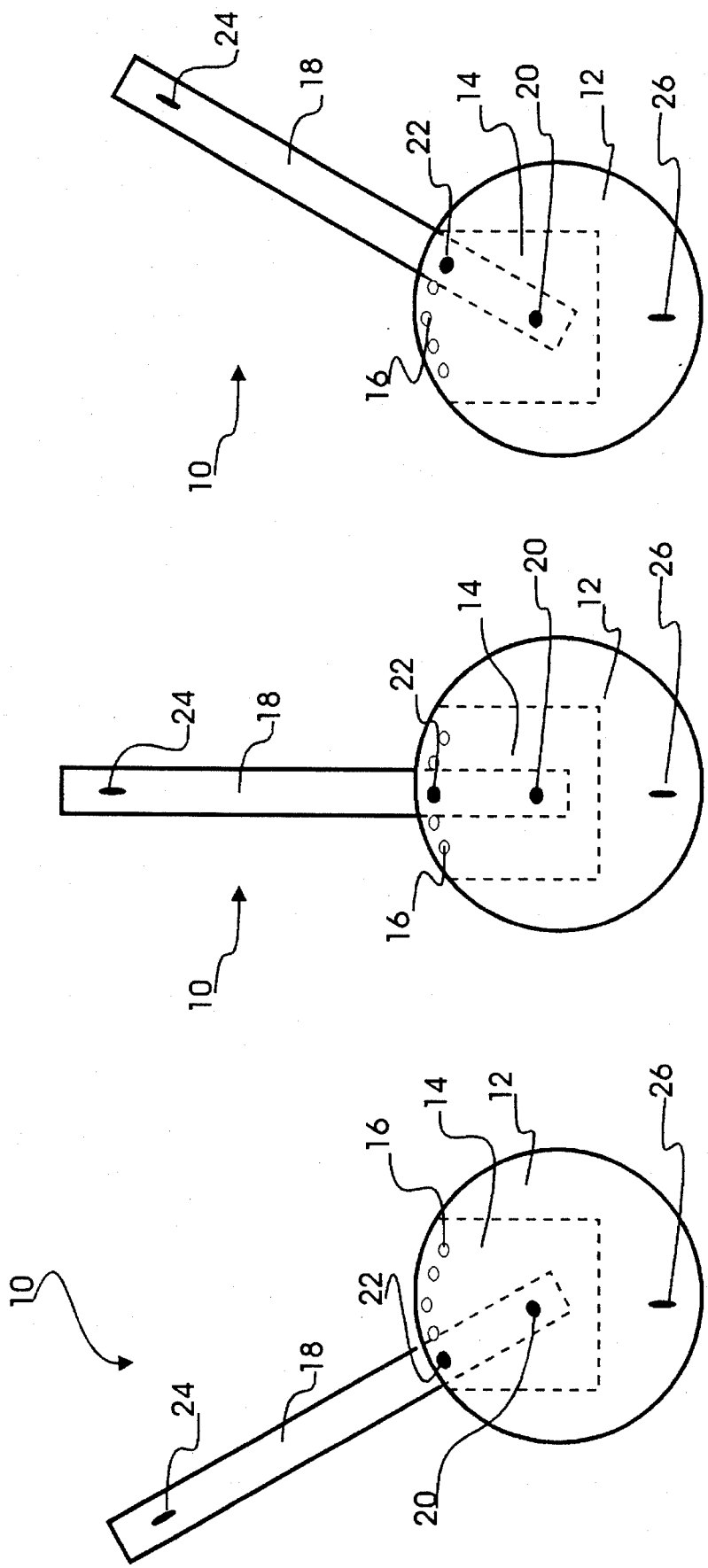

MULTIDIRECTIONAL DEEP SEA FISHING CANNONBALL

BACKGROUND OF THE INVENTION

1. Field of the Invention

The present invention relates to improvements in deep sea fishing sinkers, particularly deep sea fishing sinkers having a directional component for guidance during trolling.

2. Description of the Art

Generally, deep sea and also fresh water lakes and reservoirs fishing sinkers and trolling cannonballs are masses usually made of material having a density greater than the ambient sea water, that are rigged to one end of a tow line extending from a boat, with a leader attaching a hook and piece of bait. As the boat trolls the water, a spread of several tow lines are pulled through the water at a distance from each other and at depths depending upon the variables such as the length of the line, the speed of the vessel, and the resistance of the sinker to movement through the water, and the speed of the boat. All too frequently, tow lines become intertwined with each other as the sinker diverts from it's path due to turbulence, and crosses into the path of another line. Various types of deep sea fishing sinkers have been constructed over the years to maintain certain depth.

A trolling sinker designed to travel at various distances below the surface of the water, not depending on the weight of the trolling sinker and the speed of the boat, is noted by Madson (U.S. Pat. No. 3,023,537). The Madson trolling sinker incorporates a body and a swivel plate, to drag bait at a desired distance below the water. A tow line and leader with bait are attached to opposite ends of the body of the trolling sinker. The plate may be swiveled and fixed at various angles with respect to the body to force the trolling sinker to a desired distance below the water as the boat trolls at any speed. Additionally, the edges of the swivel plate, which act as flaps, may be manually bent to direct the sinker laterally away from the boat.

Hemmerle (U.S. Pat. No. 5,185,951) uses an out-rover lure designed to ride the surface of the water, ostensibly to guide bait laterally away from a boat at great distances from the boat. The Hemmerle out-rover lure has a body constructed of a polyurethane resin foam or other suitable sculptable material that floats on the water with slanted wings to divert the lure upwards, a main keel, a weight and a rudder positioned at an angle with a longitudinal axis extending through the main body of the lure. A fishing line and leader with bait may be attached to the body of the out-rover lure. The body is made of a lightweight material to maintain a steady course while trolling, and the weight is positioned in one of the wings to counterbalance the tendency of the out-rover lure to rotate about its longitudinal axis while being pulled.

I have discovered that deep sea fishing sinkers previously constructed to maintain a certain depth have many drawbacks. Generally, these sinkers are either too complex and expensive to produce, or do not sufficiently both allow the sinker to travel below the surface of the water while providing suitable directional guidance. The Madson '537 trolling sinker for example, which is a complex multipiece device, forces the sinker to a desired depth below the water with the swivel plate, but does not provide for an accurate method of directing the sinker laterally from a boat. The Hemmerle out-rover lure, which is also a complex device with weights positioned in the molded body having wings, a rudder and a keel, forces itself upwards as water travels across its slanted wings.

SUMMARY OF THE INVENTION

Accordingly, it is an object of the present invention to provide an improved deep sea fishing sinker.

It is another object to provide a simple, inexpensive deep sea fishing sinker able to accurately direct a line away from a boat while the sinker travels below the surface of the water.

It is yet another object to provide a simple deep sea fishing sinker with a simply shaped, evenly weighted body made of a homogeneous material, that will reliably travel along a predictable path relative to the direction of travel of a boat.

It is still another object to provide an easily manufactured, inexpensive directional fishing sinker for deep sea trolling.

It is still yet another object to provide a fishing sinker able to maintain a depth below the surface and one of a plurality of selectable orientations between a line connecting the sinker to the boat and the direction of travel of the boat.

According to the present invention, there is provided a multidirectional cannonball weight for directing a fishing line from a boat at varying depths and at selected lateral angles from a boat. The directional cannonball weight has a body made of solid, non-buoyant mass of substantially homogeneous material with a skag defining a vertical plane and serving as a rudder, extending outwardly from the body and defining an oblique angle with the direction of travel of the weight while the weight is under tow. The body and skag may be constructed as a single monolithic structure, or with the body having a slot formed in the body, a pin for pivotally fixing the skag to the body within the slot on the body so the skag protrudes from the slot of the body and may extend in varying angular orientations with respect to the body as the skag is pivoted around the pivot pin and a locking bolt for fixing the skag at a desired position. When constructed in a multidirectional configuration, the weight has a body of solid, non-buoyant mass of substantially homogeneous material having a slot formed in the body, a skag, a pivot connecting the skag to the body within the slot on the body so the skag protrudes from the slot of the body and extends at varying angular orientations from the body as the skag is pivoted around the pivot, and a locking feature for fixing the skag at a selected position.

Other details, objects and advantages of the invention will become apparent as the following description of certain present preferred embodiments thereof, present preferred methods for manufacturing the invention, and a present preferred method of practicing the same proceeds.

According to a second embodiment of the present invention, when constructed in a single directional configuration there is provided a cannonball weight for directing a fishing line from a boat at varying depths and varying lateral angles from a boat. The multidirectional cannonball includes a body of solid, non-buoyant mass of substantially homogeneous material, a skag molded to the body, a tow line eyelet molded to the body and a leader eyelet molded to the skag.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a top plan view showing a multidirectional deep sea fishing cannonball constructed in accordance with the principles of the present invention in a first position.

FIG. 2 is a top plan view showing a multidirectional deep sea fishing cannonball constructed in accordance with the principles of the present invention in a second position.

FIG. 3 is a top plan view showing a multidirectional deep sea fishing cannonball constructed in accordance with the principles of the present invention in a third position.

DETAILED DESCRIPTION OF THE INVENTION

Figure 5:
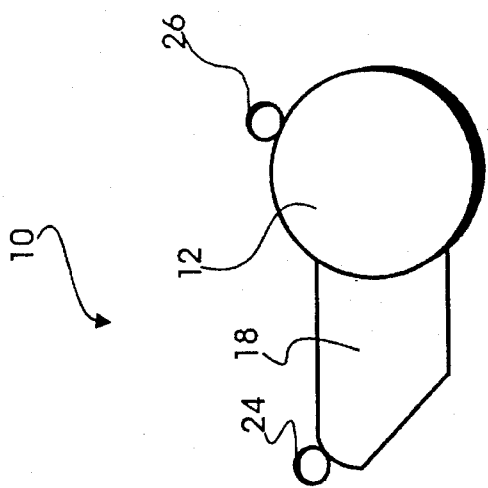
FIG. 5 is a side elevational view showing a multidirectional deep sea fishing cannonball constructed in accordance with the principles of the present invention.
Figure 4:
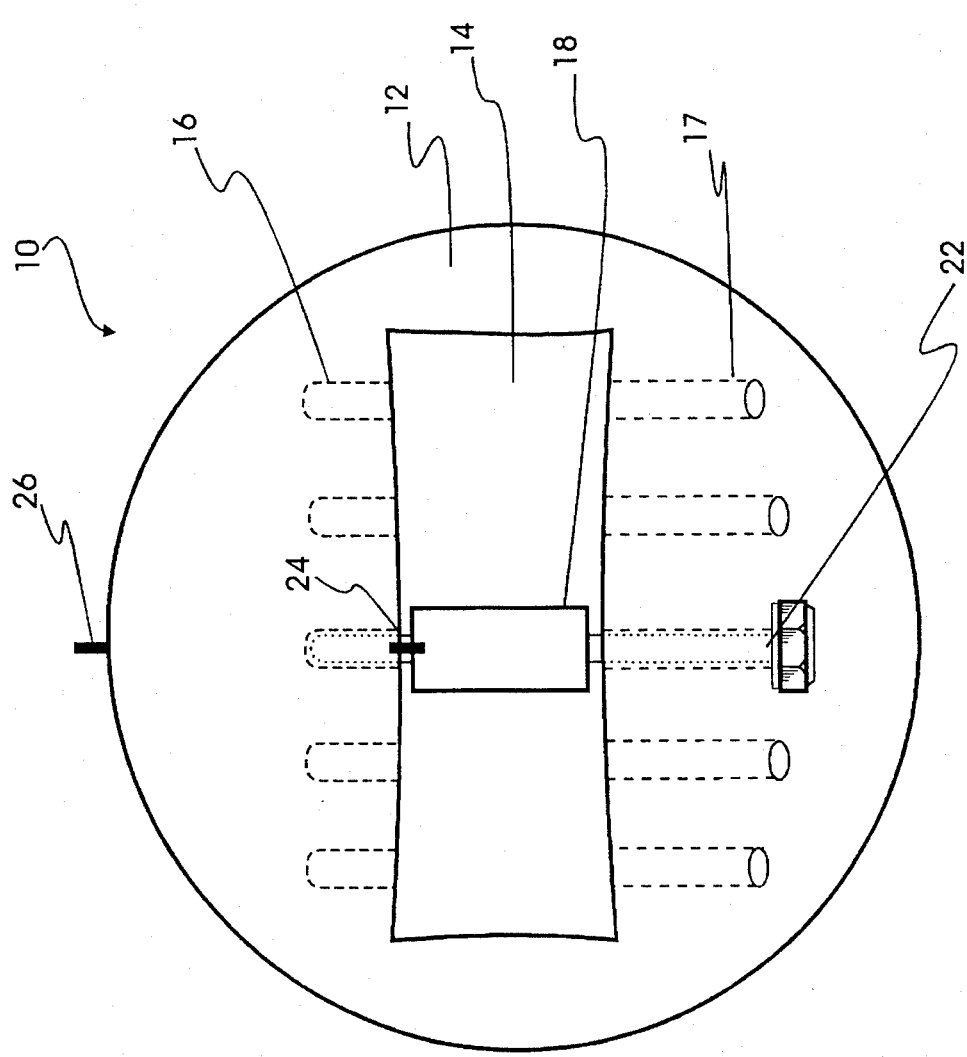
FIG. 4 is a back plan view showing a multidirectional deep sea fishing cannonball constructed in accordance with the principles of the present invention.

Referring to FIGS. 1 through 5, the multidirectional deep sea fishing cannonball 10 constructed according to the principles of the present invention is generally depicted. A body 12 has a slot 14 extending into the body 12. The body 12 is preferably spherically shaped and is made from a solid, non-buoyant mass of substantially homogeneous material. Locking holes 16, which extend into the body 12, are positioned adjacent to each other along an inner wall created by the slot 14. Through entrance holes 17, which extend through the body 12, are positioned adjacent to each other along an inner wall opposite locking holes 16. The body 12 may be constructed of an inexpensive rigid material, such as, for example, cast iron.

A skag 18 extends from the body 12 and is pivotally attached to the body 12 by a pivot pin 20. The skag 18 may be constructed of an inexpensive, rigid material such as cast iron. The pivot pin 20 extends through the skag 18 and is attached to the body 12. Pivot pin 20 may be constructed of a rigid material, such as stainless steel. A lock bolt 22, which protrudes from the body 12, extends through one of the entrance holes 17, through the skag 18 and into one of the locking holes 16. The lock bolt 22 may be removed from the skag 18 and the body 12 by sliding it out of the skag 18 and the body 12 so that the skag 18 may be pivoted to a different position and the lock bolt 22 reinserted to extend into a different locking hole 16 and maintain the skag 18 at its new position. Lock bolt 22 is preferably made of a rigid material, such as stainless steel. A leader eyelet 24 is permanently affixed to the skag 18, and a tow line eyelet 26 is permanently affixed to the body 12. Leader eyelet 24 and tow line eyelet 26 are preferably made of a rigid, inexpensive material such as cast iron.

In its intended mode of operation, the multidirectional deep sea fishing cannonball 10 provides an improved deep sea fishing sinker which may be directed in various lateral directions with respect to a boat while maintaining a depth determined by the weight of the multidirectional deep sea fishing cannon ball and the speed of the boat.

First, the user determines which direction and lateral angle with respect to the boat he or she wishes the multidirectional deep sea fishing cannonball 10 to travel within the water. The lock bolt 22 is then disengaged from the skag 18 and the body 12 so the user may pivot the skag 18 to an angle corresponding to the direction and angle he wishes the multidirectional deep sea fishing cannonball 10 to travel. The lock bolt 22 is then reinserted through one of the entrance holes 17 of the body 12, the skag 18 and into a corresponding locking hole 16 to affix the skag in the desired position. Then, multidirectional deep sea fishing cannonball 10 is dropped into the water with the tow line attached to the tow line eyelet 26, and the leader and bait attached to the leader eyelet 24. As the boat trolls the water, the skag 18 guides the multidirectional deep sea fishing cannonball 10 in the user's desired direction.

Figure 7:
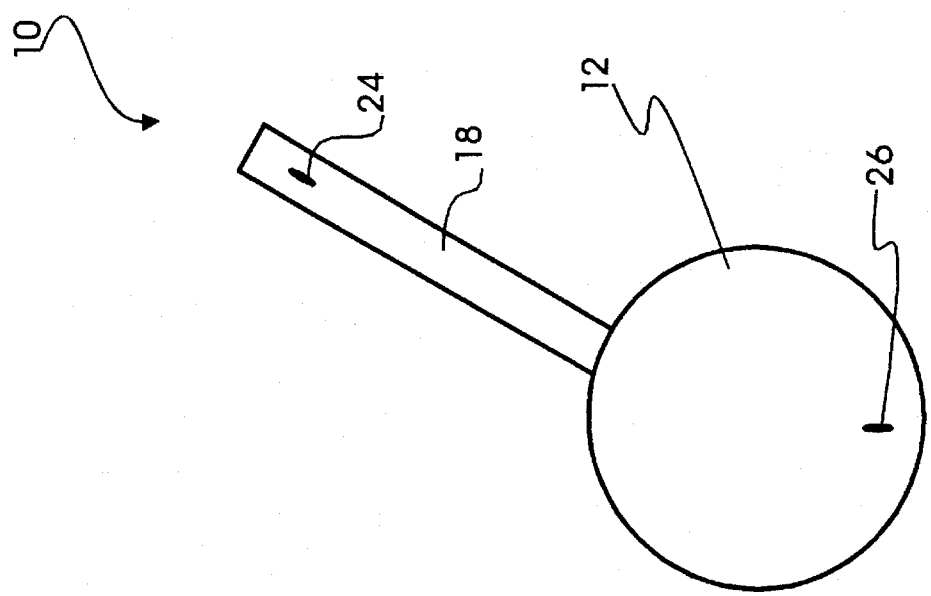
FIG. 7 is a top plan view showing a left tracking deep sea fishing cannonball constructed in accordance with the principles of the present invention.
Figure 6:
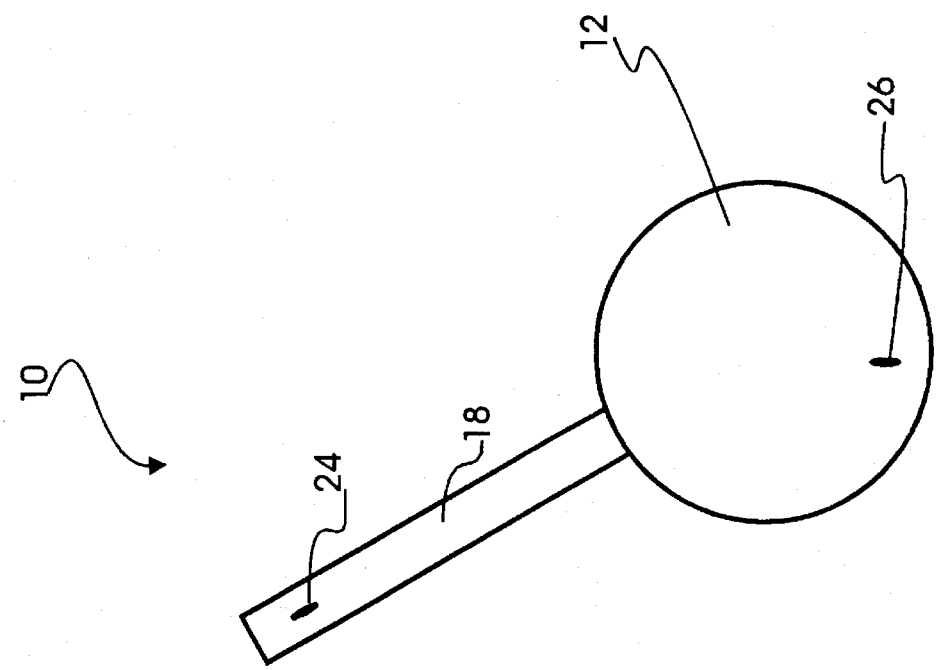
FIG. 6 is a top plan view showing a right tracking deep sea fishing cannonball constructed in accordance with the principles of the present invention.

Referring to FIGS. 6 and 7, respectively, a right tracking deep sea fishing cannonball and a left tracking deep sea fishing cannonball of the present invention is generally depicted at 10. A body 12 has skag 18 molded to and extending from the body. The body 12 and the skag 18 may be constructed of an inexpensive rigid material, for example, cast iron. The skag 18 is molded in an off center position relative to the longitudinal axis of the tow line connecting eyelet 26 to the trolling vessel, in order to force the deep sea fishing cannonball 10 to track either a right or left direction offset from the direction of travel of the trolling vessel. The skag 18 may be molded at varying degrees of offset in order to force the multidirectional deep sea fishing cannonball 10 to track at various distances to the right or the left of a trolling boat. A leader eyelet 24 is permanently affixed to the skag 18, and a tow line eyelet 26 is permanently affixed to the body 12. Leader eyelet 24 and tow line eyelet 26 are preferably made of a rigid, inexpensive material such as cast iron.

While I have shown and described a certain present preferred embodiment of the invention and have illustrated certain present preferred methods of constructing and practicing the same, it is to be distinctly understood that the invention is not limited thereto but may be otherwise variously embodied and practiced within the scope of the following claims.

I claim:

1. A multidirectional cannonball weight, comprising:

a body having a centroid, a slot formed in said body defining a plurality of slot walls, and a first axis extending through said centroid and through a center of said slot, said body being solid, non-buoyant mass of substantially homogeneous material;

a skag having a longitudinal axis extending along a length of said skag;

pivot means for pivotally coupling a proximal end of said skag to said body within said slot, with said skag protruding from said slot of said body and said longitudinal axis of said skag extending in one of a plurality of angular positions including parallel to said first axis, and varying in angular orientation relative to said first axis as said skag is pivoted around said pivot means; and locking means for fixing said skag at a selected one of said plurality of angular positions.

2. The weight of claim 1, said body further comprising:

a plurality of locking holes extending through a first one of said plurality of slot walls into said body in a direction perpendicular to said longitudinal axis and perpendicular to said first axis; and at least one entrance hole extending into said body through a second one of said plurality of slot walls opposite said first one of said slot walls, for permitting entry of said locking means into said body.

3. The weight of claim 2, wherein said locking means comprises a bolt slidably inserted through said at least one entrance hole and said skag, to engage a desired one of said plurality of locking holes.

4. The weight of claim 3, wherein said bolt is made of stainless steel.

5. The weight of claim 1, wherein said pivot means comprises a pin extending through said skag perpendicularly to said longitudinal axis of said skag and, engaging said body at opposite slot walls of said plurality of slot walls.

6. The weight of claim 5, wherein said pin is made of stainless steel.

7. A method of setting a multidirectional cannonball weight for directing a fishing line from a boat at varying lateral angles from said boat, wherein said multidirectional cannonball weight has a body constructed of a solid, non-buoyant mass of substantially homogeneous material connected to said fishing line, a skag pivotally extending from said body and locking means for fixing said skag at a desired position of a plurality of positions, comprising:

determining a lateral angle to direct said fishing line from said boat;

disengaging said locking means;

pivoting said skag to said desired position corresponding with said lateral angle; and engaging said locking means to fix said skag at said desired position.

8. A trolling weight, comprising:

a spheroidal body comprised of a sphere formed of a solid, non-buoyant mass of substantially homogeneous material and a tow line eyelet formed on an upper portion of an outer surface of said body within a diammetic first plane perpendicular to sea level extending through a centroid of said body, said eyelet, the centroid of said spheroidal body, and the geometric center of said sphere lying within said first plane;

a single planar skag surrounding a longitudinal axis extending from said spheroidal body at an oblique angle relative to said first plane, said skag defining a second plane perpendicular to sea level and corresponding to a longitudinal major surface of said skag, said skag adjoining and extending laterally asymmetrically outwardly from said outer surface with said longitudinal major surface and second plane defining an oblique angular orientation relative to said first plane;

said eyelet being spaced-apart from said second plane.

9. The weight of claim 8, further comprising said body and said skag forming a single, monolithic structure.

10. The weight of claim 8, comprising said proximal end of said skag being permanently attached to said body in an unitary, monolithic structure.

11. The weight of claim 8, comprising said non-buoyant body being a solid mass of substantially homogeneous material.

12. A trolling weight, comprising;

a spheroidal body comprising a sphere and eyelet on the surface of said sphere, a first diametric plane defined by said eyelet, the centroid of said spheroidal body, and the geometric center of said sphere;

a skag surrounding a longitudinal axis extending from said spheroidal body at an oblique angle relative to said first plane;

pivot means for pivotally coupling a proximal end of said skag to said body while a distal end of said skag projects from said body in a selected orientation laterally to either side of said first plane; and means for locking said skag in said selected orientation.

13. A trolling weight, comprising:

a spheroidal body comprising a sphere and an eyelet on the surface of said sphere, a first diametric plane defined by said eyelet, the centroid of said spheroidal body, and the geometric center of said sphere;

a skag surrounding a longitudinal axis extending from said spheroidal body at an oblique angle relative to said first plane;

said body containing a slot defining a plurality of slot walls;

pivot means extending through oppositely disposed said slot walls, for coupling a proximal end of said skag between said oppositely disposed slot walls with said skag rotatable about said pivot means to define said oblique angle with said first plane.

14. The weight of claim 13, further comprising said pivot means comprising a pin extending through said skag in a direction perpendicular to said skag and engaging said body at opposite slot walls of said plurality of slot walls.

15. A trolling weight, comprising:

a non-buoyant spheroidal body comprising a sphere and an eyelet, where a first plane is defined by said eyelet, the centroid of said spheroidal body, and the geometric center of said sphere; and a single skag asymmetrically positioned relative to said first plane to extend outwardly from said body, said skag surrounding a longitudinal axis with said skag being adjustably mated to said body to allow said longitudinal axis to intersect said first plane to form a variety of discrete angles with said first plane.

16. The weight of claim 13, further comprising:

means for fixedly coupling said skag to said spheroidal body at any one of a plurality of angular positions forming one of said variety of discrete angles between said first plane and said longitudinal axis.

17. The weight of claim 16, said coupling means further comprising a pivot permitting rotational translation of said distal end of said skag in a direction perpendicular to said longitudinal axis and perpendicular to said first plane to allow said longitudinal axis to form said variety of discrete angles with said first plane.

18. The weight of claim 16, further comprising:

said body containing a slot defining a plurality of slot walls, said slot providing means for fixedly coupling said skag to said body to allow said longitudinal axis to form said variety of discrete angles with said first plane.

19. The weight of claim 18, with said body further comprising:

a plurality of first holes extending through a first one of said plurality of slot walls into said body in a direction perpendicular to said longitudinal axis and parallel to said first plane; and at least one entrance hole extending into said body through a second one of said plurality of slot walls opposite said first one of said plurality of slot walls, for permitting entry of said means for fixedly coupling said skag to said body.

20. The weight of claim 19, further comprising:

said fixedly coupling means comprising a bolt slidably inserted through said at least one entrance hole and said skag, to engage a selected one of said plurality of locking holes; and said pivot means comprising a pin extending through said skag perpendicularly to said longitudinal axis of said skag and engaging said body at opposite slot walls of said plurality of slot walls.

21. A method of fishing, comprising:

determining a lateral angle to direct a fishing line to be trolled from a boat;

enabling rotation between a skag pivotally extending from a body of a cannonball constructed of a solid, non-buoyant mass of substantially homogeneous material connected to said fishing line by disengaging a locking mechanism Controlling said rotation;

pivoting said skag to a selected position corresponding with said lateral angle; and engaging said locking mechanism to fix said skag at said selected position.

\* \* \* \* \*